(12) United States Patent
Flottemesch et al.

(10) Patent No.: US 7,531,910 B2
(45) Date of Patent: May 12, 2009

(54) WING ENERGY UNIT

(75) Inventors: Jörg Flottemesch, Bubenreuth (DE); Hermann Holfeld, Herzogenaurach (DE); Stephan Schaller, Altdorf (DE); Michael Weinhold, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 265 days.

(21) Appl. No.: 10/593,042

(22) PCT Filed: Mar. 7, 2005

(86) PCT No.: PCT/EP2005/051003

§ 371 (c)(1),
(2), (4) Date: Sep. 15, 2006

(87) PCT Pub. No.: WO2005/091490

PCT Pub. Date: Sep. 29, 2005

(65) Prior Publication Data
US 2008/0157533 A1    Jul. 3, 2008

(30) Foreign Application Priority Data
Mar. 17, 2004   (DE)  ........................ 10 2004 013 131

(51) Int. Cl.
H02P 9/04     (2006.01)
F03D 9/00     (2006.01)

(52) U.S. Cl. .......................................... 290/44; 290/55
(58) Field of Classification Search ................... 290/44, 290/55
See application file for complete search history.

(56) References Cited

U.S. PATENT DOCUMENTS

| 4,177,507 | A | * | 12/1979 | Leete | .......................... | 363/51 |
| 4,400,659 | A | * | 8/1983 | Barron et al. | .................. | 322/32 |
| 4,685,044 | A | * | 8/1987 | Weibelzahl et al. | ........... | 363/51 |
| 4,727,467 | A | * | 2/1988 | Bendl et al. | ................... | 363/35 |
| 4,873,619 | A | * | 10/1989 | Neupauer | .................... | 363/51 |
| 4,982,147 | A | * | 1/1991 | Lauw | ......................... | 318/729 |
| 4,994,684 | A | | 2/1991 | Lauw et al. | .................... | 290/52 |
| 5,083,039 | A | * | 1/1992 | Richardson et al. | ........... | 290/44 |

(Continued)

FOREIGN PATENT DOCUMENTS

EP    1 386 078 B1    2/2004

OTHER PUBLICATIONS

S. Müller, M. Deicke, and Rik W. De Doncker; "Doubly Fed Induction Generator Systems for Wind Turbines—A Viable Alternative to Adjust Speed Over a Wide Range at Minimal Cost"; IEEE Industry Applications Magazine, May/Jun. 2002; pp. 26-33.

*Primary Examiner*—Nicholas Ponomarenko
*Assistant Examiner*—Pedro J Cuevas

(57) ABSTRACT

The invention relates to a wind energy unit, connected to an electrical 3-phase AC network, comprising a generator with a rotor, provided with a regulator device, whereby the regulator device comprises a first and a second regulation unit. A network voltage analyzer is connected to the regulator device and the electrical 3-phase AC network, by means of which a network fault can be recognized, said network fault being defined as a deviation of the network voltage sinor representation from a given set interval, whereby the second regulation unit takes over control from the first regulation unit in the case of a recognized fault and the first regulation performs the control for a non-faulty 3-phase AC network.

9 Claims, 1 Drawing Sheet

U.S. PATENT DOCUMENTS

| | | | | |
|---|---|---|---|---|
| 5,225,712 A * | 7/1993 | Erdman | | 290/44 |
| 5,239,251 A * | 8/1993 | Lauw | | 318/767 |
| 5,798,631 A * | 8/1998 | Spee et al. | | 322/25 |
| 6,130,523 A * | 10/2000 | Hughes et al. | | 322/45 |
| 6,137,187 A * | 10/2000 | Mikhail et al. | | 290/44 |
| 6,420,795 B1 * | 7/2002 | Mikhail et al. | | 290/44 |
| 6,703,718 B2 * | 3/2004 | Calley et al. | | 290/44 |
| 6,847,128 B2 * | 1/2005 | Mikhail et al. | | 290/44 |
| 6,856,040 B2 * | 2/2005 | Feddersen et al. | | 290/44 |
| 6,933,625 B2 * | 8/2005 | Feddersen et al. | | 290/44 |
| 7,015,595 B2 * | 3/2006 | Feddersen et al. | | 290/44 |
| 7,095,132 B2 * | 8/2006 | Kikuchi et al. | | 290/52 |
| 7,145,262 B2 * | 12/2006 | Kikuchi et al. | | 290/44 |
| 7,239,036 B2 * | 7/2007 | D'Atre et al. | | 290/44 |
| 7,291,937 B2 * | 11/2007 | Willisch et al. | | 290/44 |
| 7,321,221 B2 * | 1/2008 | Bucker et al. | | 322/44 |
| 7,391,126 B2 * | 6/2008 | Liu et al. | | 290/44 |
| 7,411,309 B2 * | 8/2008 | Hudson | | 290/44 |
| 7,425,771 B2 * | 9/2008 | Rivas et al. | | 290/44 |
| 2003/0071467 A1 * | 4/2003 | Calley et al. | | 290/44 |
| 2007/0182383 A1 * | 8/2007 | Park et al. | | 322/89 |
| 2007/0200348 A1 * | 8/2007 | Ichinose et al. | | 290/44 |
| 2007/0278797 A1 * | 12/2007 | Flannery et al. | | 290/44 |
| 2008/0001408 A1 * | 1/2008 | Liu et al. | | 290/44 |
| 2008/0001411 A1 * | 1/2008 | Ichinose et al. | | 290/55 |
| 2008/0106099 A1 * | 5/2008 | Ichinose et al. | | 290/44 |
| 2008/0260514 A1 * | 10/2008 | Nielsen et al. | | 415/4.3 |

* cited by examiner

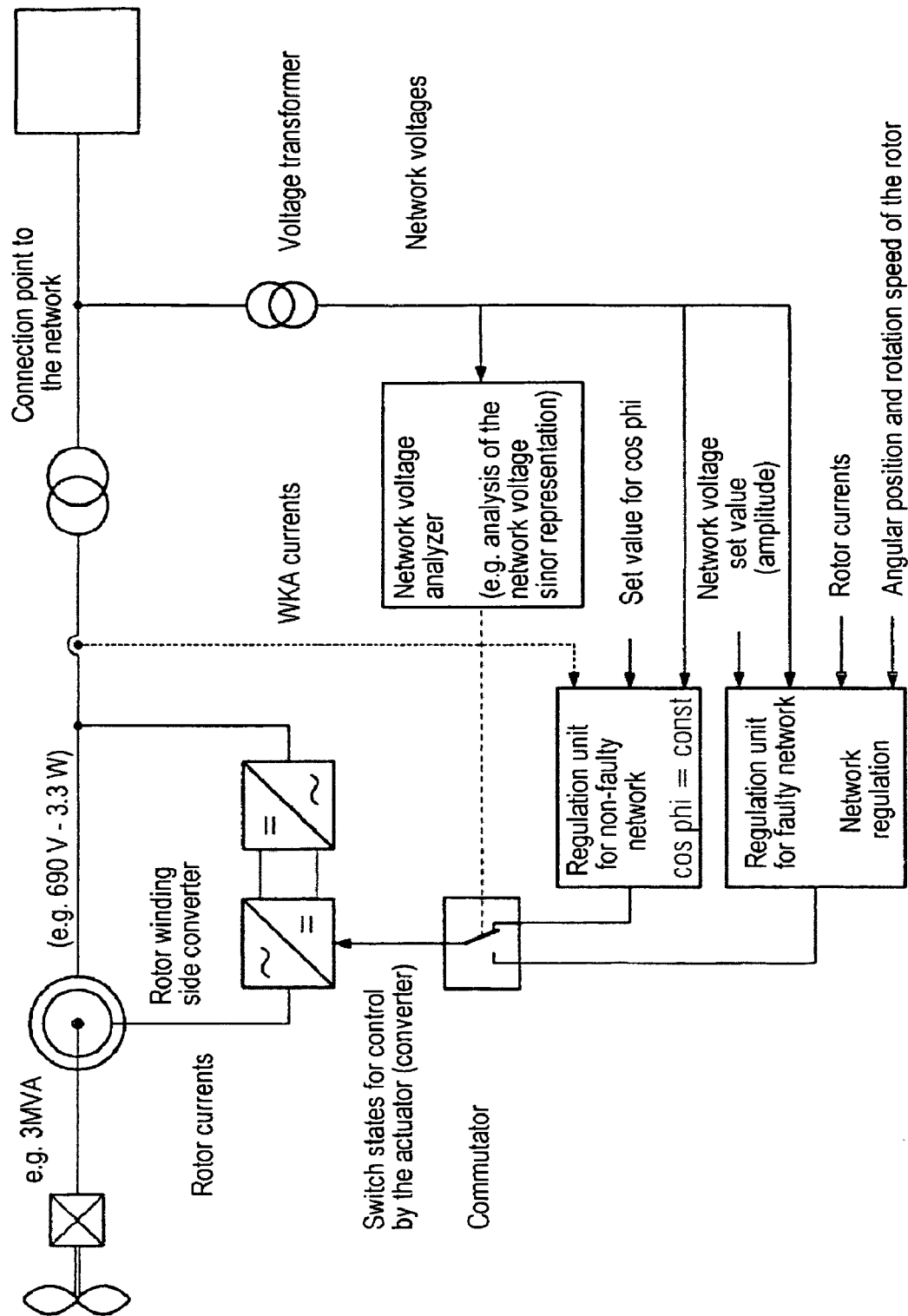

WING ENERGY UNIT

CROSS REFERENCE TO RELATED APPLICATIONS

This application is the US National Stage of International Application No. PCT/EP2005/051003, filed Mar. 7, 2005 and claims the benefit thereof. The International Application claims the benefits of German Patent application No. 10 2004 013 131.7 filed Mar. 17, 2004. All of the applications are incorporated by reference herein in their entirety.

FIELD OF THE INVENTION

The invention relates to the regulation of a wind energy unit, especially a doubly-fed asynchronous machine.

BACKGROUND OF THE INVENTION

Previously these wind energy generators were constructed and regulated in ways such as that presented in S. Müller, M. Deicke, Rik W. de Doncker: "Doubly fed induction generator systems for wind turbines—a viable alternative to adjust speed over a wide range at minimal cost", IEEE industry application magazine, May/June 2002. The converter is currently preferably designed as a back-to-back circuit of two self-commutated indirect converters. Each converter is assigned a regulation unit. The corresponding regulation unit determines the switching states of the assigned converter to be implemented and communicates these switching states to the control circuits of the converter. The control circuits are generally integrated into the converter.

The rotor winding-side converter determines with its switching states the currents flowing in the rotor windings. The network-side converter must regulate the direct current to a constant value. The network-side converter can also regulate the direct current for a number of windmills. In this case a direct current network is arranged between a number of windmills. In each case however the rotor winding-side converter is assigned to precisely one windmill.

SUMMARY OF THE INVENTION

The invention described relates especially to the regulation of the rotor winding-side converter. This converter is used as an actuator for creating a current system in the rotor windings. This current system defines the active power and reactive power exchanged between the stator windings of the machine and the 3-phase AC network.

By contrast with the known method, the inventive regulation preferably comprises a network voltage analyzer, a commutator and two separate regulation units.

Depending on the state of the 3-phase AC network (faulty or non-faulty) the assigned regulation unit is connected to the actuator (=rotor winding-side converter).

The state of the 3-phase AC network can be determined in the network voltage analyzer, by evaluation of the network voltage at the connection point of the wind energy unit or wind park to the superordinate 3-phase AC network: If the network voltage (or the amount of the network voltage sinor representation) deviates too greatly from an expected value, the 3-phase AC network is recognized as faulty. A corresponding switchover between the regulation units is then undertaken by the commutator, i.e. the rotor winding-side converter now obtains its switching status signals from the other regulation unit.

Conversely a switch back to the regulation unit "for a non-faulty 3-phase AC network" is undertaken if the network voltage measured at the connection point is once again interpreted as "non-faulty", i.e. the deviation of the network voltage from its expected value is back within a tolerance range.

The regulation units thus have the following different functions:

Regulation unit for non-faulty superordinate 3-phase AC network:

The wind energy generator is operated with a constant power factor (precisely: Basic oscillation shift factor $\cos \phi 1$). The detailed design of such regulation is known from literature.

The power factor demanded by the network operator at the connection point can if necessary deviate from the fixed setting of $\cos \phi 1$. A separate compensation unit takes care of the adaptation.

Regulation unit for faulty superordinate 3-phase AC network:

The regulation unit attempts within the framework of the adjustment range of the wind energy unit (WKA) to regulate the network voltage at the connection point to its rated value (=set value). On the one hand this mode of operation allows the WKA to contribute to clearing network errors in the superordinate 3-phase AC network and simultaneously to provide network voltage backup. Both modes are preferred operating modes of the WKA for network errors in the view of the network operator.

BRIEF DESCRIPTION OF THE DRAWINGS

The FIGURE shows a diagram in accordance with the present invention.

DETAILED DESCRIPTION OF THE INVENTION

One embodiment of the regulation implemented in the regulation unit is as follows:

The network voltage measured at the connection point between wind energy unit and network or wind farm and network is compared to a set value. The difference is evaluated in the network voltage regulator. This regulator can include a drooping characteristic to prevent oscillations between network operating resources. The output signal of the network voltage regulator is the set values for the currents to be fed by the current converter into the rotor windings.

The actual rotor winding current values are compared via a lower-ranking regulation unit with these set values. The switching states of the rotor winding-side current converter are determined by evaluating this regulation deviation.

In the calculations it can be advantageous to use information for angular position and rotational speed of the rotor. Both can be determined by corresponding additional devices (e.g.: tachogenerator and angle of rotation sensor).

The invention claimed is:

1. A wind energy unit connected to an electrical 3-phase AC network, comprising:
   a wind turbine;
   a generator having a rotor, a rotor winding and a rotor winding side converter connected to the wind turbine; and
   a generator regulation device that regulates the generator having
      a first and a second regulation unit that each operate on a rotor-winding side converter,
   wherein a network voltage analyzer connects to the electrical 3-phase AC network and determines whether a network fault has occurred if the network voltage sinor representation deviates from a predetermined set interval and if a network fault has occurred the first regulation unit is assigned to regulate a non-faulty 3-phase AC network and the second regulation unit is assigned to regulate the generator rotor winding.

2. The wind energy unit as claimed in claim 1, wherein a compensation unit undertakes a reactive power regulation with a non-faulty 3-phase AC network to a desired reactive power component determined by a basic oscillation shift factor.

3. The wind energy unit as claimed in claim 2, wherein
the reactive power regulation is regulated by the compensation unit, and
the first regulation unit is set for regulating a basic oscillation shift factor that cannot be changed during normal operation.

4. The wind energy unit as claimed in claim 3, wherein the reactive power regulation is regulated exclusively by the compensation unit.

5. The wind energy unit as claimed in claim 4, wherein the generator is a doubly-fed asynchronous generator.

6. The wind energy unit as claimed in claim 5, further comprising
a commutator that activates either the first of the second regulation units based on a specification of the network voltage analyzer.

7. The wind energy unit as claimed in claim 6, wherein the network voltage analyzer receives parameters relating to a rotor current in the generator.

8. The wind energy unit as claimed in claim 7, wherein the network voltage analyzer receives parameters relating to the angular position and the speed of rotation of the rotor in the generator.

9. The wind energy unit as claimed in claim 5, wherein the first and second regulation units are implemented by one and the same physical unit and are embodied either as first or second regulation unit by operating this physical unit with different regulation programs.

* * * * *

UNITED STATES PATENT AND TRADEMARK OFFICE
CERTIFICATE OF CORRECTION

PATENT NO. : 7,531,910 B2  Page 1 of 1
APPLICATION NO. : 10/593042
DATED : May 12, 2009
INVENTOR(S) : J. Flottemesch et al.

It is certified that error appears in the above-identified patent and that said Letters Patent is hereby corrected as shown below:

Title, cancel "Wing" and substitute --Wind--

Signed and Sealed this

Thirtieth Day of June, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,531,910 B2  Page 1 of 1
APPLICATION NO. : 10/593042
DATED : May 12, 2009
INVENTOR(S) : J. Flottemesch et al.

It is certified that error appears in the above-identified patent and that said Letters Patent is hereby corrected as shown below:

Title Page, Item (54) and Column 1, line 1
Title, cancel "Wing" and substitute --Wind--

This certificate supersedes the Certificate of Correction issued June 30, 2009.

Signed and Sealed this

Thirteenth Day of July, 2010

David J. Kappos
*Director of the United States Patent and Trademark Office*